US009525809B2

(12) United States Patent
Kondou

(10) Patent No.: US 9,525,809 B2
(45) Date of Patent: Dec. 20, 2016

(54) CONDENSATION PREVENTION CAMERA DEVICE

(71) Applicant: PANASONIC CORPORATION, Osaka (JP)

(72) Inventor: Masayoshi Kondou, Fukuoka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days.

(21) Appl. No.: 14/348,936

(22) PCT Filed: Oct. 5, 2012

(86) PCT No.: PCT/JP2012/076556
§ 371 (c)(1),
(2) Date: Apr. 1, 2014

(87) PCT Pub. No.: WO2013/051733
PCT Pub. Date: Apr. 11, 2013

(65) Prior Publication Data
US 2015/0049242 A1     Feb. 19, 2015

(30) Foreign Application Priority Data
Oct. 7, 2011  (JP) .................................. 2011-223174

(51) Int. Cl.
*H04N 5/225*     (2006.01)
*G02B 27/00*     (2006.01)
(Continued)

(52) U.S. Cl.
CPC ............ *H04N 5/2254* (2013.01); *G02B 27/00* (2013.01); *G03B 17/02* (2013.01); *G03B 17/55* (2013.01);
(Continued)

(58) Field of Classification Search
None
See application file for complete search history.

(56) References Cited

U.S. PATENT DOCUMENTS 5,096,287 A    3/1992  Kakinami et al.
5,689,304 A    11/1997 Jones et al.
(Continued)

FOREIGN PATENT DOCUMENTS

CN         1721974      1/2006
CN         201491121    5/2010
(Continued)

OTHER PUBLICATIONS

International Search Report dated Jul. 12, 2013.
(Continued)

*Primary Examiner* — Albert Cutler
(74) *Attorney, Agent, or Firm* — Greenblum & Bernstein, P.L.C.

(57) ABSTRACT

A camera device includes: a camera including a lens; a first casing including a light-transmitting cover disposed to oppose the lens; a second casing which supports the camera within the first casing, and which surrounds the camera such that a side of the second casing opposing the light-transmitting cover is spaced from the camera with a gap; and an air flow path which allows air within the second casing to flow out toward the light-transmitting cover via the gap. The air flow path is formed between the second casing and a lens barrel of the lens.

20 Claims, 4 Drawing Sheets

(51) Int. Cl.
*G03B 17/55* (2006.01)
*G03B 17/02* (2006.01)
*G08B 13/196* (2006.01)

(52) U.S. Cl.
CPC ....... *H04N 5/2252* (2013.01); *G08B 13/19619* (2013.01)

(56) References Cited

U.S. PATENT DOCUMENTS

| | | | | |
|---|---|---|---|---|
| 7,515,202 | B2* | 4/2009 | Saito | G02B 7/022 348/374 |
| 8,405,766 | B2* | 3/2013 | Tatewaki | G03B 17/02 348/143 |
| 2003/0103161 | A1* | 6/2003 | Tatewaki | G08B 13/19619 348/375 |
| 2005/0276599 | A1 | 12/2005 | Kajino et al. | |
| 2006/0108352 | A1 | 5/2006 | Fernandez | |
| 2006/0171704 | A1* | 8/2006 | Bingle et al. | 396/419 |
| 2009/0237537 | A1* | 9/2009 | Maruyama et al. | 348/294 |
| 2010/0201794 | A1* | 8/2010 | Kido et al. | 348/65 |
| 2012/0062789 | A1* | 3/2012 | Sasaki | G03B 17/00 348/373 |
| 2012/0212664 | A1* | 8/2012 | Hou et al. | 348/374 |

FOREIGN PATENT DOCUMENTS

| | | |
|---|---|---|
| EP | 1626583 | 2/2006 |
| JP | 03-266739 | 11/1991 |
| JP | 08-205007 | 8/1996 |
| JP | 09-172564 | 6/1997 |
| JP | 2002-341432 | 11/2002 |
| JP | 2004-317900 | 11/2004 |
| JP | 2005-215463 | 8/2005 |
| JP | 2006-010983 | 1/2006 |
| WO | 2008/033008 | 3/2008 |

OTHER PUBLICATIONS

Office Action issued in China Counterpart Patent Appl. No. 201280049166.1, dated Feb. 29, 2016, along with an English translation thereof.

* cited by examiner

CONDENSATION PREVENTION CAMERA DEVICE

TECHNICAL FIELD

The present invention relates to a camera device such as a surveillance camera provided with a dew condensation preventing structure.

BACKGROUND ART

In a surveillance camera disposed in the outdoor, when the outside air temperature reduces abruptly, dew condensation appears on the inner surface of a camera casing. The dew condensation causes the degradation of a surveillance image. Patent Literature 1 describes a camera device provided with a dew condensation preventing structure so as to prevent the appearance of dew condensation. As shown in FIG. 6, a camera device 100 includes a base 101 and a cover 102 both configuring a casing. A dome 104, formed by transparent plastics and serving as a window member for imaging, is attached to a ring portion 103 of the cover 102. A lens 105 is provided within the dome 104 such that the direction of the lens 105 is changeable. A fan heater unit 106 is provided in the base 101. In the fan heater unit 106, a fan generates wind for preventing the dew condensation. The wind is discharged from a discharge port 108 of a nozzle 107 which is held by and disposed beside the lens 105 such that the direction of the nozzle is changeable together with the lens 105. According to this camera device 100, since the nozzle 107 is held beside the lens 105, the direction of the nozzle 107 is also changed together with the change of the direction of the lens 105. Thus, the dew condensation at the window member can be efficiently prevented so that good images can be obtained.

CITATION LIST

Patent Literature

Patent Literature 1: JP-A-2005-215463 (claim 1, FIG. 1, paragraphs 0006-0007)

SUMMARY OF INVENTION

Technical Problem

However, the camera device 100 requires the dedicated fan heater unit 106 and nozzle 107, which leads to increase of the number of the components and the production cost. In this respect, the camera device 100 can not remove the dew efficiently. Further, since the nozzle 107 is held beside the lens 105, although fog of the lens 105 formed on the side close to the discharge port 108 of the nozzle 107 is likely to be removed, fog of the lens formed on the side far from the discharge port 108 is unlikely to be removed. A plurality of the nozzles 107 may be provided in the circumferential direction of the lens 105. However, in this case, as compared with the portion on the lens near the discharge port 108, the fog formed on the remaining portion of the lens can not be removed satisfactorily. That is, the fog can not be reduced uniformly in the circumferential direction of the lens 105.

An aspect of the present invention is made in view of the above-described circumstances, and an object thereof is to provide a camera device which can reduce fog efficiently.

Solution to Problem

One aspect of the invention provides a camera device including: a camera including a lens; a first casing including a light-transmitting cover disposed to oppose the lens; a second casing which supports the camera within the first casing, and which surrounds the camera such that a side of the second casing opposing the light-transmitting cover is spaced from the camera with a gap; and an air flow path which allows air within the second casing to flow out toward the light-transmitting cover via the gap, wherein the air flow path is formed between the second casing and a lens barrel of the lens.

According to this configuration, fog of the light-transmitting cover formed in the vicinity of the lens can be efficiently suppressed.

The camera device may include a heating member provided within the second casing, wherein the air warmed by the heating member flows into the air flow path.

The heating member may include a circuit board configured to drive at least an image pickup element.

The second casing may be supported so as to be movable along the light-transmitting cover.

The second casing may include a wall portion which covers a periphery of the lens so as to have a gap therebetween, wherein the wall portion also serves as a gripping portion at a time of adjusting an imaging direction.

The wall portion may have a cylindrical shape.

A distal end portion of the wall portion may be disposed between the lens and the light-transmitting cover.

The distal end portion of the wall portion may be disposed at a position which protrudes relative to the lens so as not to cause vignetting at a time of imaging.

Another aspect of the invention provides a camera device including: a first casing including a light-transmitting cover disposed to oppose a lens; and a second casing which surrounds a heating member, wherein the second casing has at least one opening provided in a vicinity of the lens.

The heating member may include a circuit board configured to drive at least an image pickup element.

The second casing may be supported so as to be movable along the light-transmitting cover.

According to this configuration, a distance between the lens and the light-transmitting cover is kept at a constant value even when the lens is directed to any direction. Thus, the fog of the light-transmitting cover can be efficiently removed uniformly even when the lens is directed to an arbitrary direction.

The second casing may include a wall portion which covers a periphery of the lens so as to have a gap therebetween, wherein the wall portion also serves as a gripping portion at a time of adjusting an imaging direction.

According to this configuration, since it is possible to prevent fingers from directly touching the lens, the deterioration of an image can be prevented.

The wall portion may have a cylindrical shape.

A distal end portion of the wall portion may be disposed between the lens and the light-transmitting cover.

The distal end portion of the wall portion may be disposed at a position which protrudes relative to the lens so as not to cause the vignetting at a time of imaging.

According to this configuration, the fog of the light-transmitting cover can be efficiently suppressed uniformly. Further, since the distal end portion of the cylindrical wall portion does not enter into the imaging range, the generation of the vignetting can be prevented at the time of imaging.

Advantageous Effect of Invention

According to the camera device of the above-described aspects, the fog can be efficiently removed uniformly.

DESCRIPTION OF EMBODIMENTS

Hereinafter, an embodiment according to the invention will be explained with reference to accompanying drawings.

Figure 1:
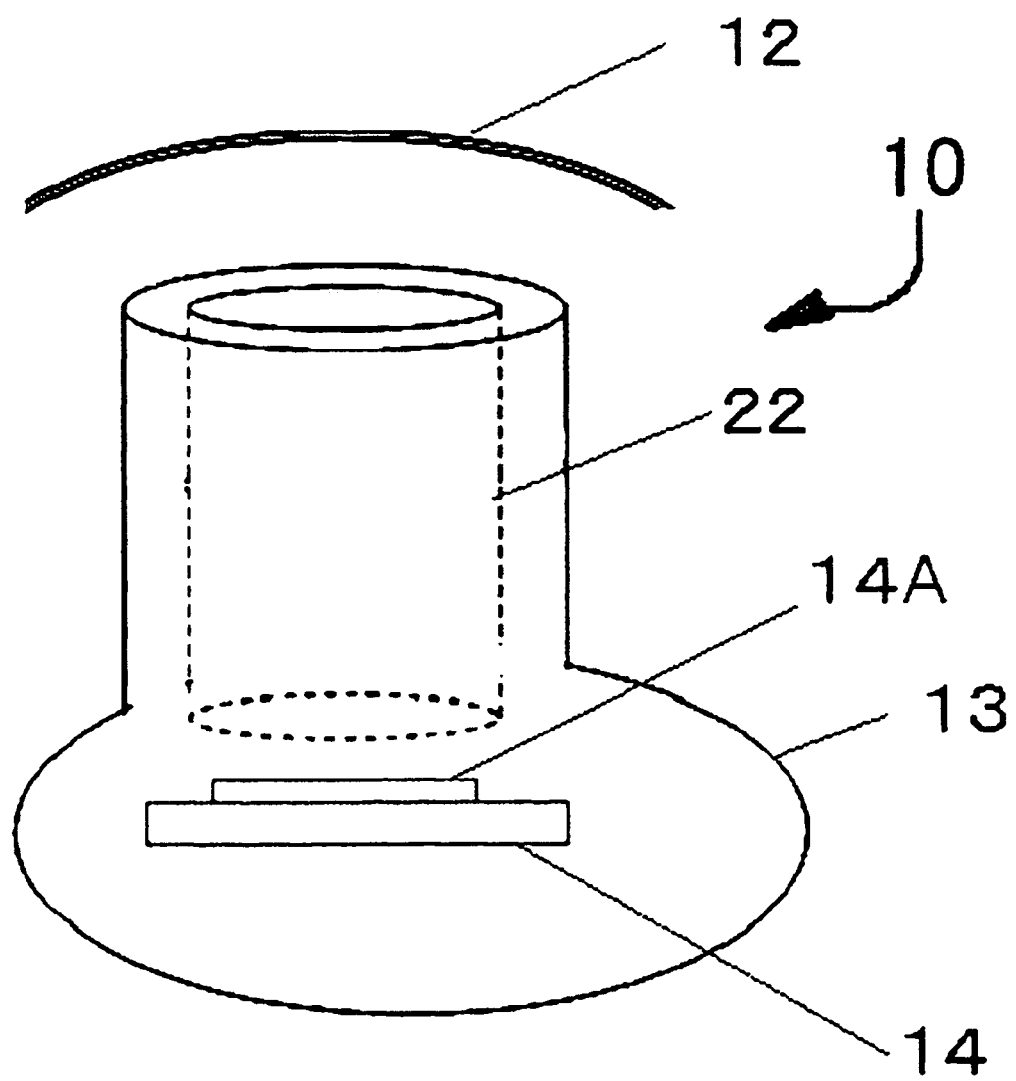
FIG. 1 is a conceptual diagram showing a surveillance camera according to an embodiment of the invention.

FIG. 1 is a conceptual diagram showing a surveillance camera according to the embodiment of the invention.

First, the concept of the embodiment will be explained with reference to FIG. 1. A surveillance camera 10 includes a light-transmitting cover 12 and a movable camera case 13. The movable camera case 13 is provided with a lens 22, an image pickup element 14A and a circuit board 14 described later. A gap is formed between the movable camera case 13 and an outer periphery of a lens barrel of the lens 22. When the surveillance device 10 is powered on, the image pickup element 14A and the circuit board 14 are driven, thereby generating heat. The air within the movable camera case 13 is warmed by the heat generated by the image pickup element 14A and the circuit board 14. The warmed air flows toward the cover 12 via the gap between the lens barrel of the lens 22 and the movable camera case 13. The warmed air contacts air in the vicinity of the cover 12, thereby suppressing the moisture in the vicinity of the cover 12.

Since moisture in the vicinity of the cover 12 is suppressed, the fog of the cover 12 can be suppressed.

In this embodiment, the fog is not suppressed over the entire surface of the cover 12. However, since the heat generated by driving the surveillance camera 10 is concentrically applied to a range of the cover 12 to which the lens 22 is directed, the fog of the cover 12 can be suppressed efficiently without using a fan and a heater.

In addition to the above-described gap formed between the movable camera case 13 and the lens 22, the movable camera case 13 may have other slight gaps. When the slight gaps are narrower than the gap between the movable camera case 13 and the lens barrel of the lens 22, the warmed air is flown toward the cover 12 via the gap between the movable camera case 13 and the lens barrel of the lens 22.

Next, the embodiment according to the invention will be explained in detail with reference to FIGS. 2 to 4.

Figure 2:
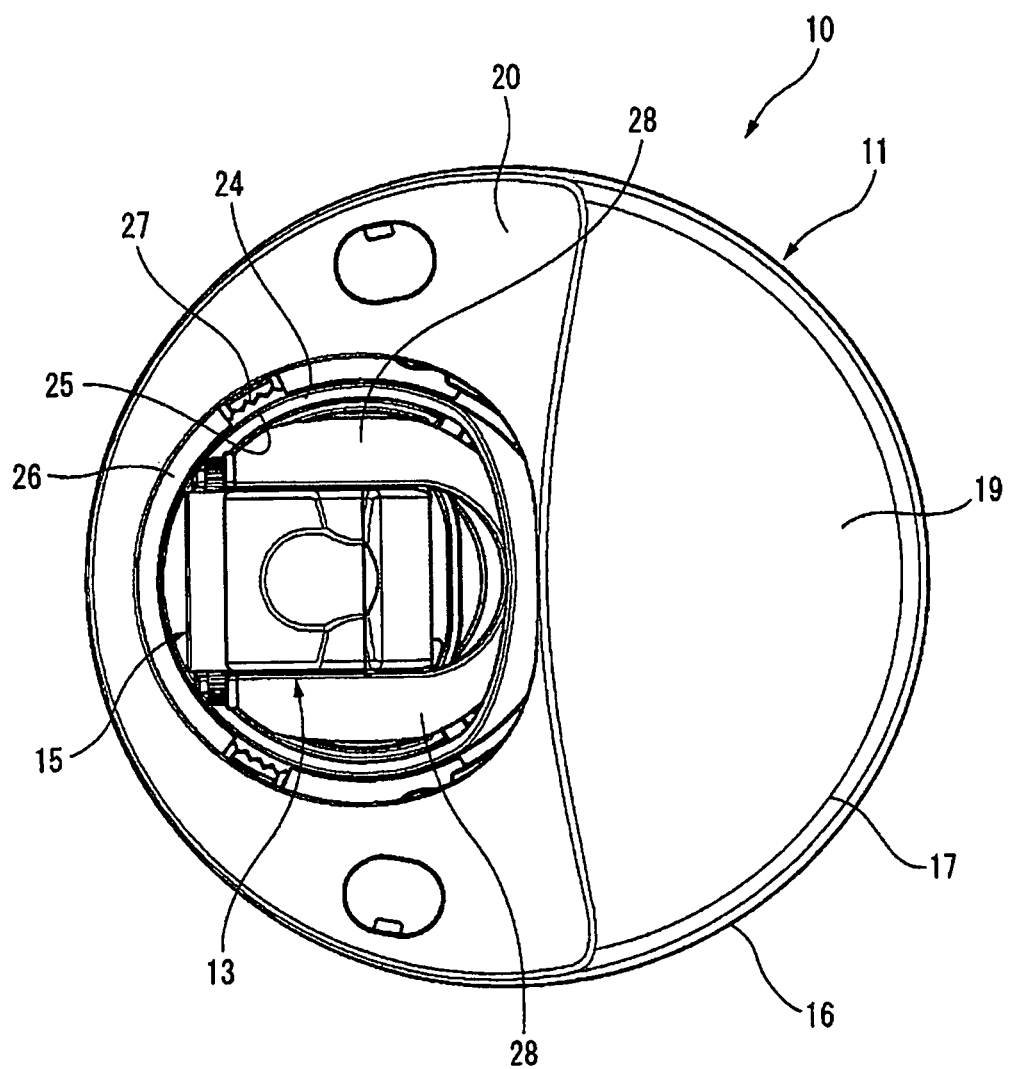
FIG. 2 is a plan view showing the surveillance camera according to the embodiment of the invention.
Figure 3:
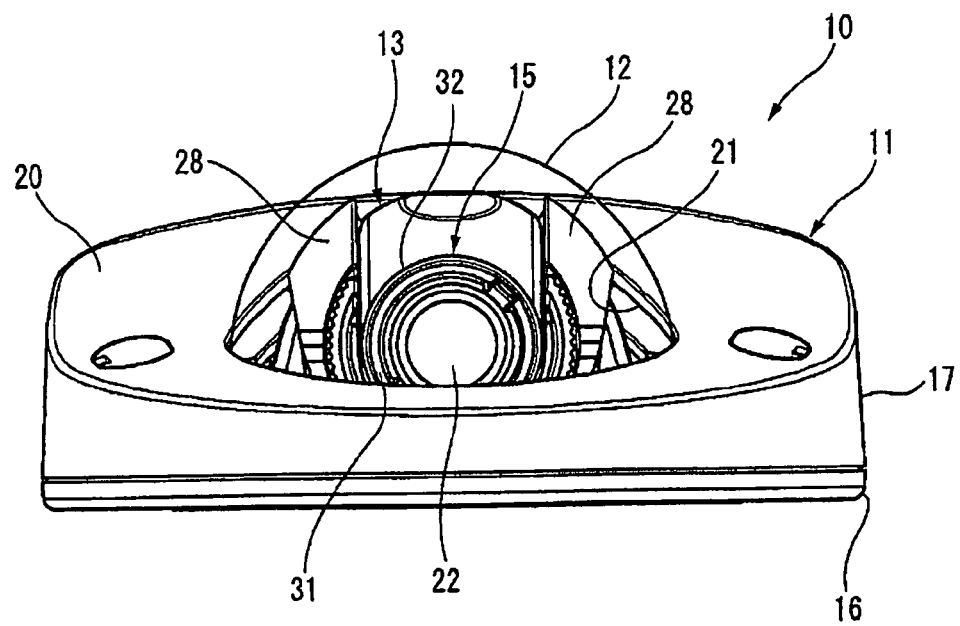
FIG. 3 is a front view of the surveillance camera shown in FIG. 2.
Figure 4:
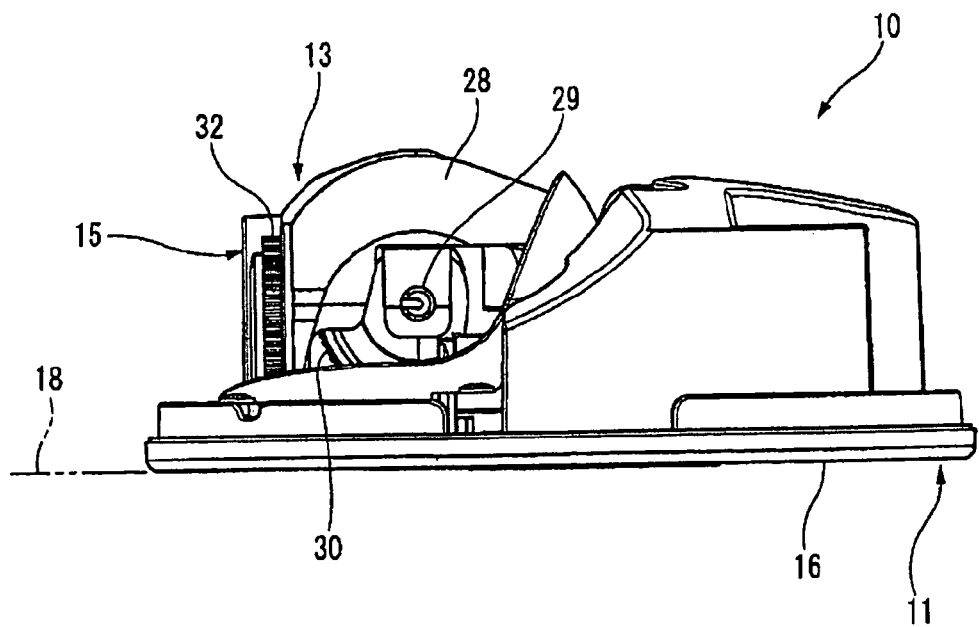
FIG. 4 is a side view of the surveillance camera shown in FIG. 2 in which the cover and the casing thereof are partially omitted.

FIG. 2 is a plan view showing the surveillance camera according to the embodiment of the invention, FIG. 3 is a front view of the surveillance camera shown in FIG. 2, and FIG. 4 is a side view of the surveillance camera shown in FIG. 2 in which the cover and the casing thereof are partially omitted.

The surveillance camera 10 serving as an example of a camera device according to the embodiment includes: a casing 11 serving as an example of a first casing; the light-transmitting cover 12; the movable camera case 13 serving as an example of a second casing; the circuit board 14 on which the image pickup element 14A is mounted (see FIG. 5); and a cylindrical wall 15. The casing 11 includes a base portion 16 and an exterior portion 17. In the casing 11, the base portion 16 to be attached to an attachment surface 18 is formed in a circular shape in plan view, and the exterior portion 17 is attached to the base portion 16. When the attachment surface 18 is a ceiling, the surveillance camera 10 is disposed downward.

The exterior portion 17 is formed in a flat cylindrical shape, and the opposite side to the base portion 16 is covered by a front end wall 19. Almost half of the front end wall 19 is formed as a slanted wall 20 which is inclined downward toward the base portion 16. The slanted wall 20 has an opening 21 of an almost circular shape. The opening 21 allows access to the inner portion of the casing 11. The cover 12 for closing and opening the inside of the casing 11 is attached to the opening 21 (see FIG. 3) so as to be detachable. The cover 12 is formed, for example, by light-transmitting composite resin.

The cover 12 has a shape along the locus of the lens 22 described later (see FIG. 5). In this embodiment, the lens 22 is rotatable in the pan direction and the tilt direction. The cover 12 has a dome shape forming a part of a spherical surface.

The lens 22 may be rotatable in only one of the pan direction and the tilt direction. In this case, the cover 12 may be formed by a part of a cylindrical peripheral surface.

The lens 22 may not be rotatable in the pan direction nor the tilt direction.

The movable camera case 13 contains therein a camera 23 (see FIG. 5) including the lens 22 and the circuit board 14. The movable camera case 13 is supported so as to be movable within the casing by a panning mechanism and a tilting mechanism such that the lens 22 is disposed at an arbitrary position of the opening 21. In this embodiment, the movable camera case 13 can be moved in the pan direction and the tilt direction manually.

In this respect, the movable camera case 13 may not be moved manually but may be moved by a pan motor and a tilt motor in the pan direction and the tilt direction.

The panning mechanism includes a circular plate 24 shown in FIG. 2. The circular plate 24 is held so as to be rotatable such that an outer peripheral edge 25 thereof is held by the flange portion 26 of the base portion 16. Pan engagement teeth 27 are formed at the outer peripheral edge 25 of the circular plate 24 so that the circular plate 24 makes the pan engagement teeth 27 engage with the base portion side, whereby the circular plate rotates in a manner of generating click feeling. That is, the circular plate can be held at a desired rotation position.

The tilting mechanism includes a pair of supporting walls 28. Each of the supporting walls 28 is erected from the circular plate 24. A tilt shaft 29 extends in parallel to the plate surface of the circular plate 24, and is rotatably supported by the supporting walls 28, whereby the tilt shaft 29 (see FIG. 4) supports the movable camera case 13. Tilt engagement teeth 30 of a circular shape (see FIG. 4) are formed around the tilt shaft 29 at the side portion of the movable camera case 13. The engagement teeth 30 engage with the supporting wall side, whereby the movable camera case 13 rotates in a manner of generating click feeling. That is, the movable camera case 13 can be held at a desired tilt angle.

The cylindrical wall 15 described later (see FIG. 5) is formed so as to protrude relative to the movable camera case 13. The lens 22 is disposed within the cylindrical wall 15 so as to have the gap 31 between the lens 22 and inner periphery of the cylindrical wall 15. A non-slip portion 32 (see FIG. 4) is provided at the outer periphery of the cylindrical wall 15. The imaging direction can be set by moving the movable camera case 13 to change the direction of the lens 22 while watching a monitor. The imaging direction is set and positioned by rotating the lens 22 in the pan direction and the tilt direction while the non-slip portion 32 is gripped by the fingers. In other words, the cylindrical wall 15 also serves as a gripping portion which is used, for example, for an adjustment knob. Since the surveillance camera 10 is provided with the non-slip portion 32, it is possible to prevent the finger from directly touching the lens 22 at the time of adjusting the imaging direction. Thus, the degradation of an image can be prevented.

Figure 5:
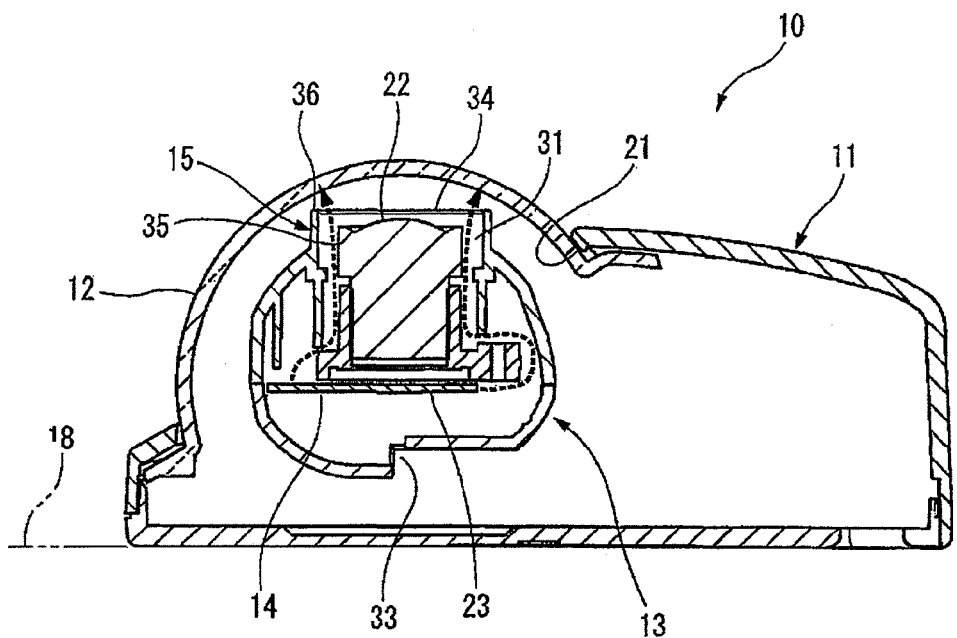
FIG. 5 is a cross-sectional view showing the main portion of the surveillance camera in which the optical axis of the lens of the surveillance camera shown in FIG. 2 is perpendicular to an attachment surface.
Figure 6:
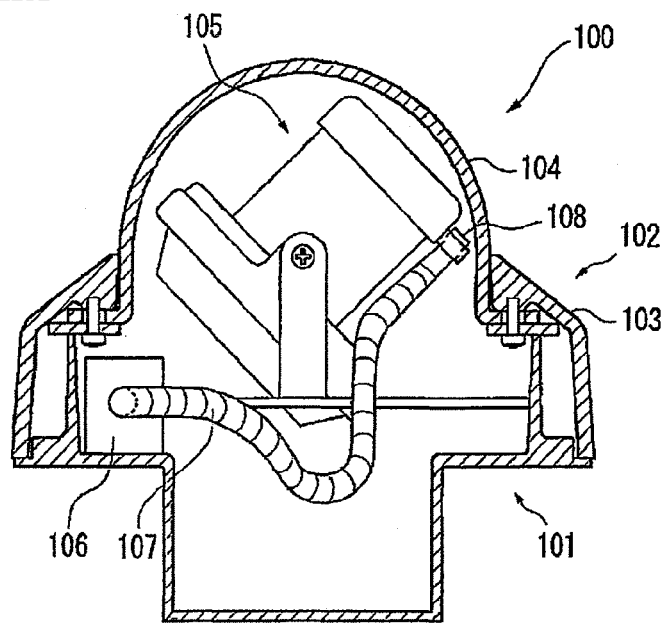
FIG. 6 is a sectional diagram showing a camera device of a related art.

FIG. 5 is a cross-sectional view showing the main portion of the surveillance camera 10 in which the optical axis of the lens 22 of the surveillance camera 10 in FIG. 2 is perpendicular to the attachment surface 18.

The camera 23 provided with the lens 22 and the circuit board 14 is supported within the movable camera case 13. The circuit board 14 is disposed on the rear side of the lens 22 within the movable camera case 13. In addition to the image pickup element 14A, a plurality of electronic components constituting an imaging circuit, an image processing circuit, an image transmission circuit, etc. are mounted on the circuit board 14. The temperature of the circuit board 14 increases when the image pickup element 14A, the imaging circuit, etc. are driven. A wire extraction slit 33 is formed at the movable camera case 13. A flexible flat cable (FFC) for coupling the circuit board 14 and a control board within the casing penetrates through the wire extraction slit 33.

The movable camera case 13 storing the camera 23 therein has an almost airtight structure in which most of the gaps of the movable camera case 13 other than the gap formed between the cylindrical wall 15 and the lens barrel 35 holding the lens 22 have a tiny area. Also, the wire extraction slit 33 is almost filled up with the flat cable. The lens barrel 35 holding the lens 22 is disposed within the movable camera case 13 in a coaxial manner with the cylindrical wall 15 of the movable camera case 13. In other words, the cylindrical wall 15 surrounds the lens barrel 35 via the gap 31.

In this embodiment, the cylindrical wall 15 extends toward the circuit board 14 and covers almost the entirety of the camera 23. Thus, one end of the cylindrical wall 15 on the opposite side of the lens 22 is disposed near the circuit board 14. The gap 31 formed between the camera 23 and the cylindrical wall 15 is arranged such that the one end side thereof along the axis line is opened within the movable camera case 13 and the other end side thereof is opened to the outside of the movable camera case 13 (that is, within the casing 11). That is, the inside of the movable camera case 13 is opened to the outside (within the casing 11) via the gap 31. The gap 31 has the one end opened to the lens side and the other end opened to the circuit board side, and forms an air flow path which allows the inner air to flow out as shown by dotted lines in FIG. 5.

The distal end portion 36 of the cylindrical wall 15 is disposed between the lens 22 and the cover 12, at a position which protrudes relative to the lens 22 so as not to cause vignetting at the time of imaging. The term "vignetting" represents a phenomenon that an image becomes dark partially since a part of the casing, etc. of the camera enters into an image pickup range. Thus, a slight gap is formed between the cylindrical wall 15 and the cover 12. This gap has a constant width even when the lens 22 is directed to any direction since the cover 12 is formed along the locus of the lens 22.

Next, the operation of the surveillance camera 10 having the configuration will be explained.

When the image pickup element 14A and the imaging circuit, etc. are driven, the temperature of the circuit board 14 increases, whereby the temperature around the circuit board increases due to the heat transmission. Then, the temperature of the air within the movable camera case 13 increases. The air within the movable camera case 13 expands due to the temperature increase thereof and hence flows to the outside of the movable camera case 13 via the gap 31 formed between the lens barrel 35 of the lens 22 and the cylindrical wall 15. The high-temperature air thus flown out flows around the lens 22 to thereby uniformly warm the lens 22 in the circumferential direction thereof.

In most cases, the surveillance camera 10 is attached to a direction that the attachment surface 18 serves as a ceiling. That is, the surveillance camera 10 is attached to be oriented in the opposite direction to FIG. 5. In this case, also the air within the movable camera case 13 expands due to the temperature increase thereof, and hence there arises a pressure difference between the inside and the outside of the movable camera case 13. Thus, the high-temperature air within the movable camera case 13, which pressure has been increased, flows out via the gap 31 formed between the lens barrel 35 of the lens 22 and the cylindrical wall 15. The external air flows via the slight gaps such as the wire extraction slit 33 into the movable camera case 13 from which the high-temperature air has flown out. Then, the external air flown into the movable camera case is warmed again by the circuit board 14 and blown out via the gap 31.

Further, in the surveillance camera 10, since the cylindrical wall 15 protrudes relative to the lens 22, the lens 22 is disposed coaxially inside of the cylindrical wall 15 serving as the flow path of the warmed air. Thus, this camera also has the effects that the fog can be removed efficiently from the entirety of the lens uniformly.

According to the embodiment, since the distal end portion 36 of the movable camera case 13 is disposed between the lens 22 and the cover 12, the high-temperature air flown out from the distal end portion 36 of the cylindrical wall 15 is blown against the cover 12 opposing the lens 22, so that the fog of the cover 12 can be suppressed. Further, since the cylindrical wall 15 moves together with the lens 22 such that the cylindrical wall 15 is directed to the same direction as the lens 22, the fog is not suppressed over the entire surface of the cover. However, the fog formed at the portion of the cover in the imaging direction can be suppressed by concentrically and efficiently utilizing a small amount of heat of the circuit board 14 for the required portion.

In this manner, according to the camera device of this embodiment, the fog can be reduced efficiently.

This application claims the benefit of Japanese Patent Application No. 2011-223174 filed on Oct. 7, 2011, the contents of which are incorporated herein by reference.

INDUSTRIAL APPLICABILITY

The invention is applicable, for example, to a surveillance camera provided with a dew condensation prevention structure.

REFERENCE SIGNS LIST

10 Surveillance Camera
11 Casing
12 Cover
13 Movable Camera Case
14 Circuit Board
15 Cylindrical Wall
21 Opening 22 Lens
23 Camera
31 Gap
36 Distal End Portion

The invention claimed is:

1. A camera device comprising:
a camera including a lens and a lens barrel;
a first casing including a light-transmitting cover opposed to the lens;
a second casing which supports the camera such that the second casing is spaced from the light-transmitting cover with a gap, the second casing is enclosed by the first casing;
an air flow path which allows air within the second casing to flow out toward the light-transmitting cover via the gap,
wherein the air flow path is positioned between the second casing and the lens barrel, and
a heating member provided within the second casing,
wherein the air warmed by the heating member flows into the air flow path,
wherein the second casing has an opening, of which a width is greater than a width of the lens, formed by a distal end portion that is closer to the light-transmitting cover than the lens in an optical axis direction of the lens.

2. The camera device according to claim 1,
wherein the heating member comprises a circuit board configured to drive at least an image pickup element.

3. The camera device according to claim 2,
wherein the second casing further comprises a cable slit that is smaller than the opening through which the circuit board connects via a cable to a control board located outside of the second casing.

4. The camera device according to claim 3,
wherein the circuit board is positioned between the lens and the cable slit.

5. The camera device according to claim 1,
wherein the second casing is supported so as to be movable along the light-transmitting cover.

6. The camera device according to claim 1,
wherein the second casing comprises a wall portion which covers a periphery of the lens so as to have a gap therebetween, and
wherein the wall portion also serves as a gripping portion at a time of adjusting an imaging direction.

7. The camera device according to claim 6,
wherein the wall portion has a cylindrical shape.

8. The camera device according to claim 1,
wherein the distal end portion of the second casing is disposed between the lens and the light-transmitting cover.

9. The camera device according to claim 1,
wherein the distal end portion of the second casing is disposed at a position which protrudes relative to the lens so as not to cause vignetting at a time of imaging.

10. The camera device according to claim 1,
wherein the second casing is completely enclosed by the first casing, and the second casing is movable within the first casing.

11. The camera device according to claim 1,
wherein a distance between the distal end portion and the light-transmitting cover in an optical axis direction of the lens is less than a distance between the lens and the light-transmitting cover in the optical axis direction of the lens.

12. The camera device according to claim 11,
wherein the distance between the distal end portion and the light-transmitting cover in the optical axis direction of the lens is less than a distance between the lens barrel and the light-transmitting cover in the optical axis direction of the lens.

13. A camera device comprising:
a first casing including a light-transmitting cover;
a second casing, positioned in the first casing;
a camera, including a lens and an imager, which is supported by and positioned in the second casing, the lens being positioned between the light-transmitting cover and the imager, the imager taking an image through the lens;
an air flow path which is formed by an outer surface of the lens and an inner surface of the second casing and corresponds to a gap between the outer surface of the lens and the inner surface of the second casing;
wherein the second casing has an opening, of which a width is greater than a width of the lens, formed by a distal end portion that is closer to the light-transmitting cover than the lens in an optical axis direction of the lens,
wherein the imager is positioned in an upstream side of the air flow path and the distal end portion is positioned in a downstream side of the air flow path,
wherein air warmed by the imager flows into the light-transmitting cover through the opening, the warmed air flowing from the upstream side to the downstream side.

14. The camera device according to claim 13,
wherein the imager comprises an image pickup element and a circuit board on which the image pickup element is mounted, a length of the circuit board in a planar direction is greater than a width of the lens in a perpendicular direction to an optical axis direction of the lens.

15. The camera device of claim 13,
wherein the second casing comprises a wall portion which is positioned on an inside of the second casing, the wall portion having a cylindrical shape and including the distal end portion,
wherein the lens is positioned in the wall portion.

16. The camera device of claim 15,
wherein a portion, including the distal end portion, of the wall portion protrudes from a second portion of the second casing toward the light-transmitting cover.

17. The camera device according to claim 13,
wherein the imager comprises an image pickup element and a circuit board on which the image pickup element is mounted,
the second casing further comprises a cable slit that is smaller than the opening through which the circuit board connects via a cable to a control board located outside of the second casing.

18. The camera device according to claim 13,
wherein a distance between the distal end portion and the light-transmitting cover in an optical axis direction of the lens is less than a distance between the lens and the light-transmitting cover in the optical axis direction of the lens.

19. The camera device according to claim 18,
wherein the distance between the distal end portion and the light-transmitting cover in the optical axis direction of the lens is less than a distance between the lens barrel and the light-transmitting cover in the optical axis direction of the lens.

20. A camera device comprising:

a first casing including a light-transmitting cover;

a second casing, positioned in the first casing, which has an opening formed by a distal end portion of the second casing;

a camera, including a lens and an imager, which is supported by and positioned in the second casing, the lens being positioned between the light-transmitting cover and the imager, the imager taking an image through the lens;

an air flow path which is formed by an outer surface of the lens and an inner surface of the second casing and corresponds to a gap between the outer surface of the lens and the inner surface of the second casing;

wherein the imager is positioned in an upstream side of the air flow path and the distal end portion is positioned in a downstream side of the air flow path, wherein air warmed by the imager flows into the light-transmitting cover through the opening, the warmed air flowing from the upstream side to the downstream side, wherein a distance between the distal end portion and the light-transmitting cover in an optical axis direction of the lens is less than a distance between the lens and the light-transmitting cover in the optical axis direction of the lens.

\* \* \* \* \*